United States Patent
Panneer et al.

(10) Patent No.: US 9,563,253 B2
(45) Date of Patent: Feb. 7, 2017

(54) TECHNIQUES FOR POWER SAVING ON GRAPHICS-RELATED WORKLOADS

(71) Applicant: Intel Corporation, Santa Clara, CA (US)

(72) Inventors: Selvakumar Panneer, Hillsboro, OR (US); Tion A. Thomas, Hillsboro, OR (US); Travis T. Schluessler, Hillsboro, OR (US); Adam Z. Leibel, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 77 days.

(21) Appl. No.: 13/797,876

(22) Filed: Mar. 12, 2013

(65) Prior Publication Data

US 2014/0281615 A1    Sep. 18, 2014

(51) Int. Cl.
*G06F 1/32* (2006.01)
*G06F 9/48* (2006.01)

(52) U.S. Cl.
CPC .............. *G06F 1/3234* (2013.01); *G06F 1/329* (2013.01); *G06F 1/3215* (2013.01); *G06F 1/3228* (2013.01); *G06F 1/3243* (2013.01); *G06F 9/4881* (2013.01); *G06F 9/4893* (2013.01); *Y02B 60/1239* (2013.01); *Y02B 60/144* (2013.01); *Y02B 60/32* (2013.01)

(58) Field of Classification Search
CPC ..... G06F 1/3203; G06F 1/3228; G06F 1/3293
USPC .................................. 713/320, 322, 323, 324
See application file for complete search history.

(56) References Cited

U.S. PATENT DOCUMENTS

| | | | |
|---|---|---|---|
| 6,535,982 B1 * | 3/2003 | Kawabe et al. | 713/300 |
| 6,795,873 B1 | 9/2004 | Barth et al. | |
| 7,256,788 B1 | 8/2007 | Viet-Tam et al. | |
| 8,738,951 B2 * | 5/2014 | Wong et al. | 713/324 |
| 2002/0087225 A1 * | 7/2002 | Howard | 700/94 |
| 2003/0210247 A1 | 11/2003 | Cui et al. | |
| 2005/0024365 A1 * | 2/2005 | Ohba | 345/501 |
| 2005/0223249 A1 * | 10/2005 | Samson | 713/320 |
| 2006/0126421 A1 | 6/2006 | Hwang et al. | |
| 2007/0079161 A1 * | 4/2007 | Gupta | 713/324 |
| 2009/0300390 A1 * | 12/2009 | Vojak et al. | 713/323 |
| 2010/0131787 A1 * | 5/2010 | White et al. | 713/322 |
| 2011/0023040 A1 | 1/2011 | Hendry et al. | |
| 2011/0050713 A1 | 3/2011 | McCrary et al. | |
| 2012/0249559 A1 | 10/2012 | Khodorkovsky et al. | |
| 2014/0002739 A1 * | 1/2014 | Kwa et al. | 348/536 |

OTHER PUBLICATIONS

Notice of Patent Allowance received for Korean Patent Application No. 10-2014-0028353, mailed Apr. 1, 2015, 3 pages including 1 page English translation.

(Continued)

*Primary Examiner* — Vincent Tran

(57) ABSTRACT

Various embodiments are generally directed to an apparatus, method and other techniques for monitoring a task of a graphics processing unit (GPU) by a graphics driver, determining if the task is complete, determining an average task completion time for the task if the task is not complete and enabling a sleep state for a processing circuit for a sleep state time if the average task completion time is greater than the sleep state time.

25 Claims, 7 Drawing Sheets

(56) References Cited

OTHER PUBLICATIONS

Extended European Search Report received for European Patent Application No. 14159095.0, mailed Jul. 2, 2015, 7 pages.
"Advanced Configuration and Power Interface Specification Revision 5", Nov. 6, 2011, XP055166778, Retrieved from http://www.acpi.info/Downloads/ACPIspec50/pdf, 7 pages.

* cited by examiner

600

```
MONITOR A TASK OF A GRAPHICS PROCESSING UNIT (GPU)
BY A GRAPHICS DRIVER
605
```

```
DETERMINE IF THE TASK IS COMPELTE
610
```

```
DETERMINE AN AVERAGE COMPLETION TIME FOR THE
TASK IF THE TASK IS NOT COMPLETE
615
```

```
ENABLE A SLEEP STATE FOR A PROCESSING CIRCUIT FOR A
SLEEP STATE TIME IF THE AVERAGE COMPLETION TIME IS
GREATER THAN THE SLEEP STATE TIME
620
```

*FIG. 6*

TECHNIQUES FOR POWER SAVING ON GRAPHICS-RELATED WORKLOADS

TECHNICAL FIELD

Embodiments described herein generally relate to graphics processing on a computing device. In particular, embodiments relate to enabling sleep state periods during processing of graphics-related operations, processes or tasks.

BACKGROUND

Many applications require graphics intensive processes or operations to be processed by a graphics processing unit (GPU) in a computer system. A GPU is generally any processing unit optimized to perform graphics-related operations as well as the video decoder engines and the frame correlation engines. Applications may send these graphics-related operations and wait for the completion and the results of these graphics-related operations. Applications may send the graphics-related operations to the GPU and then check the status of the graphics-related operations through an application programming interface (API) function call. The application may check the status in a loop until the graphics-related operations are complete. Having the applications check the completion status of graphics-related operations in a loop consumes a significant amount of power and also affects performance due to power throttling between a processing circuit and the GPU. It is with respect to these and other considerations that the embodiments described herein.

BRIEF DESCRIPTION OF THE DRAWINGS

FIG. 6 illustrates an embodiment of a third logic flow.

DETAILED DESCRIPTION

Figure 1:
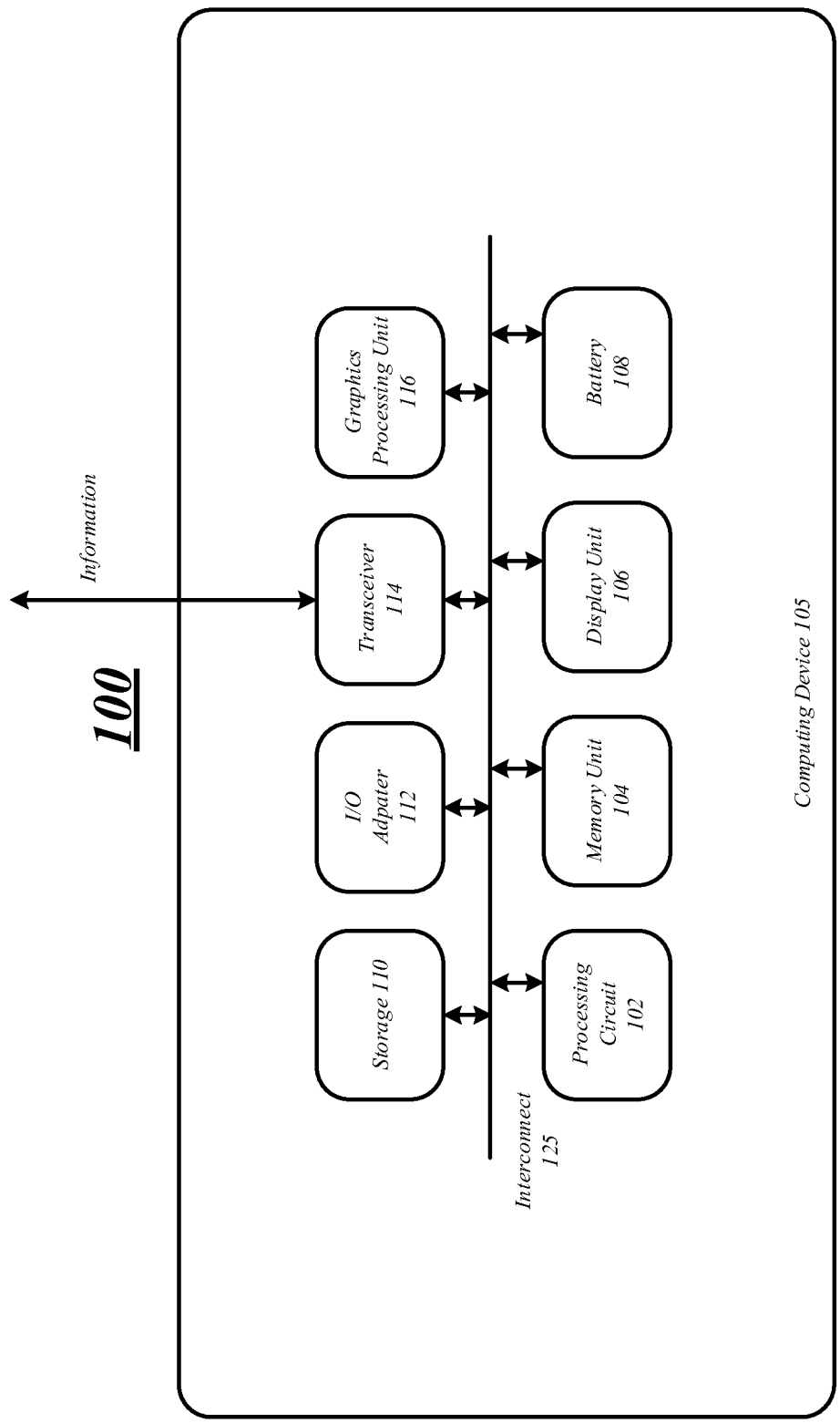
FIG. 1 illustrates an embodiment of a first system.

In various embodiments, one or more applications may send a graphics-related operation or task to a GPU for processing. The graphics-related operation or task may be sent to the GPU through an API and monitored by a graphics driver. The one or more applications may wait for completion of processing and may request a completion status of the task while the task is waiting to be processed or is being processed by the GPU. In various embodiments, the one or more applications may request the completion status of the task in a loop or spin loop from the graphics driver via the API to determine if a particular task has been completed. The one or more applications may use this technique to determine the completion status of any graphics-related operations or tasks sent to the GPU for processing. For example, an application may use this technique to determine if a particular draw call is completely occluded in a 3-dimensional (3D) scene or if the GPU has finished processing a 3D operation, such as an event query. The embodiments are not limited in this manner and any graphics-related operations that may be processed by the GPU are contemplated in this disclosure.

As previously discussed, having the applications check the completion status of graphics-related operations in a loop consumes a significant amount of power because the device and/or processing circuit cannot enter a sleep state and are always processing at full processing power. Moreover, having the applications check the completion status in a loop also affects performance due to power throttling between a processing circuit and the GPU. Various implementations are directed to solving these and other problems.

In various implementations, the graphics driver may be instructed to monitor the completion time for each graphics-related operation or task and add a sleep time for a processing circuit based on an average completion time. For example, if the graphics-related operation or task takes on average 10 milliseconds to complete by the GPU, the graphics driver may provide instructions to put the processing circuit to sleep at 1 millisecond intervals until the graphics-related operation or task is completed. By putting the processing circuit into a sleep state at 1 millisecond intervals, the processing circuit may be in a sleep state for a maximum amount of time without degrading performance. In addition, the application may continue to process other tasks or work in parallel. Enabling the sleep state for the processing circuit saves power by not processing operations while in the sleep state. In various embodiments, the processing circuit may only be put into a sleep state during a long spin loop, e.g., when the processing circuit power is wasting more on executing the spin loop. This ensures that a maximum amount of power may be saved without effecting performance of the application.

In various embodiments, the graphics driver may be proactively notified that the graphics-related operation or task is complete. For example, a kernel mode driver may proactively notify the user mode driver when the task is complete via an operating system event notification. This added feature has the benefit of reducing any performance loss incurred when the task completes in the middle of the sleep state by waking the user mode driver and processing circuit before completion of the sleep cycle. Various embodiments and implementations are discussed in further detail herein.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments.

Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates one embodiment of a computing system, in particular, computing system 105. In various embodiments, computing system 105 may be representative of a computing system suitable for use with one or more embodiments described herein, such as, logic flow 300 of FIG. 3, logic flow 400 of FIG. 4, and/or logic flow 600 of FIG. 6. The embodiments are not limited in this respect.

As shown in FIG. 1, computing system 105 may include multiple elements. One or more elements may be implemented using one or more circuits, components, registers, processors, software subroutines, modules, or any combination thereof, as desired for a given set of design or performance constraints. Although FIG. 1 shows a limited number of elements in a certain topology by way of example, it can be appreciated that more or less elements in any suitable topology may be used in computing system 105 as desired for a given implementation. The embodiments are not limited in this context.

In various embodiments, computing system 105 may include a processing circuit 102. Processing circuit 102 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 102 may be connected to and communicate with the other elements of the computing system via an interconnect 125, such as one or more buses, control lines, and data lines.

In one embodiment, computing system 105 may include a memory unit 104 to couple to processing circuit 102. Memory unit 104 may be coupled to processing circuit 102 via interconnect 125, or by a dedicated communications bus between processing circuit 102 and memory unit 104, as desired for a given implementation. Memory unit 104 may be implemented using any machine-readable or computer-readable media capable of storing data, including both volatile and non-volatile memory. In some embodiments, the machine-readable or computer-readable medium may include a non-transitory medium. The embodiments are not limited in this context.

The memory unit 104 can store data momentarily, temporarily, or permanently. The memory unit 104 stores instructions and data for computing system 105. The memory unit 104 may also store temporary variables or other intermediate information while the processing circuit 102 is executing instructions. The memory unit 104 is not limited to storing the above discussed data; the memory unit 104 may store any type of data.

In various embodiments, computing system 105 may include a display unit 106. Display unit 106 may constitute any display device capable of displaying information received from processing circuit 102. The display unit 106 may include at least one of a Liquid Crystal Display (LCD), a Thin Film Transistor-LCD (TFT-LCD), an Organic Light Emitting Diode (OLED), a flexible display, a three-dimensional (3D) display and a projector, for example. The display unit 106 may display a User interface (UI) or a Graphical User Interface (GUI) associated with controlling functionality of the computing system 105. The computer device may include two or more display units, according to various embodiments. For example, in one embodiment, the computing device may include two LCD displays.

In various implementations, computing system 105 may include a battery 108. The battery 108 may be any type of battery to store power for the computing system 105 including, but not limited to, a lithium ion battery, a nickel cadmium battery, zinc chloride battery, or the like. The battery may be rechargeable. In some embodiments, the computing system 105 may have more than one battery. In some embodiments, the battery may be removable. In other embodiments, the battery may be fixed.

In various embodiments, computing system 105 may include storage 110. Storage 110 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 110 may include technology to increase the storage performance enhanced protection for valuable digital media when multiple hard drives are included, for example. Further examples of storage 110 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

Computing system 105 may include one or more I/O adapters 112, in some embodiments. Examples of I/O adapters 112 may include Universal Serial Bus (USB) ports/adapters, IEEE 1394 Firewire ports/adapters, and so forth. The embodiments are not limited in this context.

In various embodiments, computing system 105 may include a transceiver 114. Transceiver 114 may include one or more radios capable of transmitting and receiving signals and information using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 114 may operate in accordance with one or more applicable standards in any version. The embodiments are not limited in this context.

Computing system 105 may include a graphics processing unit (GPU) 116, in various embodiments. The GPU 116 may include any processing unit, logic or circuitry optimized to perform graphics-related operations as well as the video decoder engines and the frame correlation engines. The GPU 116 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 116 may process any type of graphics data such as pictures, videos, programs, animation, 3D, 2D, and so forth.

Figure 2:
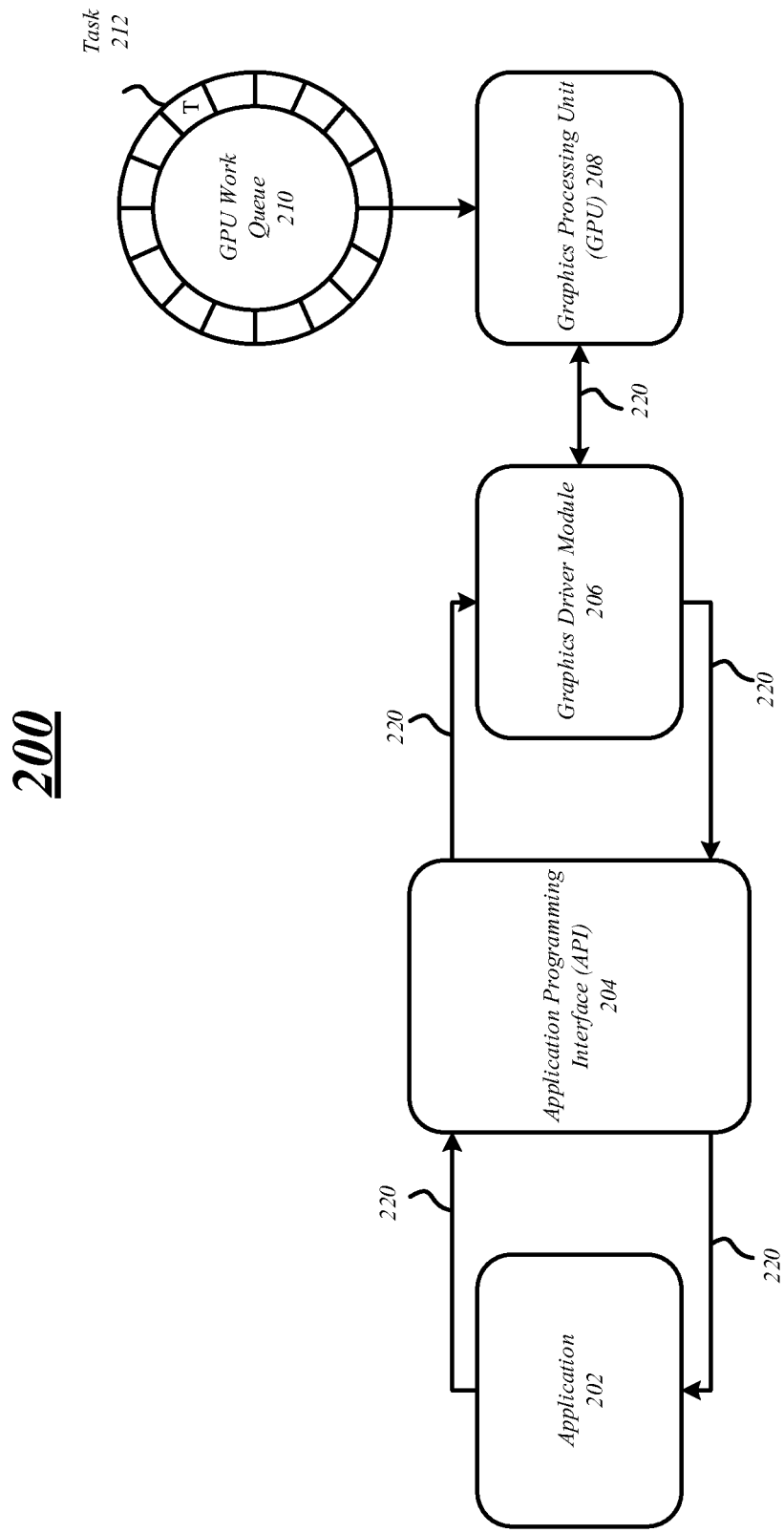
FIG. 2 illustrates an embodiment of a second system.

FIG. 2 illustrates a first block diagram of system 200 for processing graphics for an application. As shown in FIG. 2, system 200 may include multiple modules and elements for processing graphics and graphics-related operations. In various embodiments, system 200 may include application 202, application programming interface (API) module 204, graphics driver 206, graphics processing unit (GPU) 208 and GPU work queue 210. In various embodiments, GPU work queue 210 may store one or more tasks 212 to be completed or processed by the GPU 208. The modules and elements of system 200 may communicate with each other via one or more software and/or hardware interconnects 220, such as one or more buses, traces, pathways, and so forth. The various modules and elements may communicate information with each other via any software communication method, such as a message, a HTML message, an XML message, a call, a function call, middleware, Common Object Request Broker Architecture (CORBA), etc.

System 200 may not be limited to these specific modules and elements shown in FIG. 2. For example, system 200 may include any number of modules and elements to process graphics and graphics-related operations. In various embodiments, certain modules and elements of system 200 may operate on or in conjunction with computing system 105. For example, the modules and elements of system 200 may be stored in memory 104 and processed by processing circuit 102.

Application 202 may be any type of application or software. In various embodiments, application 202 may be enterprise software, accounting software, office suites, graphics software, gaming software, media software, web-based application, computer system software, educational software, simulation software, content access software, media development software, product engineering software, and so forth. Application 202 is not limited in this manner; application 202 may be any type of application or software for processing data on a computing system.

Application programming interface (API) module 204 may be any type of API for processing graphic information between the modules and elements of system 202. For example, in various embodiments, API module 204 provides an abstraction layer between the application 202 and a graphics driver module 206 such that the application and graphics driver module may communicate between each other. API module 204 may enable communication between the modules and elements of system 200 through various messages or calls, such as a function call. In various embodiments, API module 204 may be a graphics API such as such as Direct3D® or OpenGL®.

Graphics driver module 206 may be any type of graphics driver software that that provides and interface between graphics hardware and software operating on system 200. For example, graphics driver module 206 may provide an interface for and enable communication between the graphics processing unit 208 and the other modules and elements of system 200. However, graphics driver module 206 is not limited in this manner. For example, graphic driver module 206 may enable communication between the graphics processing unit 208 and an operating system (not shown) operating on system 200. In various embodiments, graphics driver module 206 may receive function calls from application 202 executing on the computing system 105. The graphics driver module 206 may also route the function calls to the GPU 208 so that graphics may be rendered by the GPU 208. In various embodiments, the graphics driver module 206 may be stored in memory 104 and processed by processing circuit 102. However, the graphics driver module 206 is not limited in this manner. The graphics driver module 206 may be stored in any type storage device and may be processed by any type of processing device.

In various embodiments, the graphics drive module 206 may be a user mode driver. A user-mode driver runs in the non-privileged processor mode in which other application code, including protected subsystem code, executes. A user mode driver cannot gain access to system data except by calling an API, such as API 204. The API then calls system services. However, various embodiments are not limited in this manner; graphics driver module 206 may be a conjunction of a user mode driver and a kernel mode driver working together. A kernel mode driver runs as part of the operating system's executive, the underlying operating system component that supports one or more protected subsystems.

Graphics processing unit (GPU) 208 may be any type of processing circuit for processing graphics. GPU 208 may contain multiple processing units that concurrently perform independent operations. GPU 208 may implement a number of graphics primitive operations for processing tasks received from an application. In various embodiments, the GPU 208 may process any type of graphics task, including but not limited to, drawing, texturing, rendering 3-dimensional (3-D) graphics, rendering 2-dimensional (2-D) graphics, matrix computations and vector computations.

In various embodiments GPU 208 may render frame data. For example, GPU 208 may receive frame data from one or more applications such as application 202. GPU 208 receives frame data, e.g., all or in part generated by an application running on the processing circuit 102. GPU 208 may then render the frame data to generate rendered frames (e.g., files of digital pixel information corresponding to all or part of a video frame or graphic) that can be provided to a display device such as display unit 106. However, GPU 208 is not limited in this manner. GPU 208 may process any type of graphical information received from an application or the operating system.

GPU work queue 210 may be any type of buffer or memory to store tasks to be completed by the GPU 208. In some embodiments, GPU work queue 210 may be any kind of data structure to store tasks such as a ring buffer, bit array, dynamic array, hash table, hash array tree, sparse array, etc. GPU work queue 210 may be any portion of memory unit 104 set aside by the processing circuit 102 to store tasks to be completed by the GPU 208. In other embodiments, GPU work queue 210 may be separate memory (not shown) to store GPU tasks. In some instances, GPU work queue 210 may be more than one memory or buffer.

GPU work queue 210 may store tasks to be retrieved by the GPU 208. Typically, the graphics driver module 206 inserts tasks into the work queue 210. However, various embodiments are not limited in this manner. Tasks may be inserted into the GPU work queue 210 via other elements of the computing system, such as the operating system.

In various embodiments, GPU 208 may asynchronously retrieve the tasks to be processed next from the GPU work queue 210. The selection of the task to be processed next may be based on a priority ordering specified by the processing circuit 102. In some instances, the processing circuit 102 may specify priority on a per task basis. In other instances, the processing circuit 102 may specify a priority associated with a memory, and any task queued in the memory will have the priority associated with that memory.

Task 212 may be any type of task to be completed by the GPU 208. In various embodiments, task 212 may be any type of graphics-related task, including but not limited to, a drawing task, a texturing task, a rasterization task, pixel processing task, a shading task, rendering 3-dimensional (3-D) images or graphics, rendering 2-dimensional (2-D) images and graphics, matrix computations, vector computations, etc.

In various embodiments, task 212 may be received from application 202 for processing by the GPU 208. The task 212 may be received by the GPU 208 via API 204. The task 212 may be assigned a priority for processing and inserted in the GPU work queue 210 to be processed. For example, task 212 may be inserted into GPU work queue 210 such that five other task 212s must be processed before task 212 is processed. In other embodiments, task 212 may be immediately processed.

Various modules and elements may communicate with each other via interconnects 220. For example, in various embodiments, application 202 may send a function call to API 204 to determine a completion status of the task 212 processed by GPU 208. The API 204 may then communicate with the graphics driver 206 via another function call to retrieve the completion status for the particular task 212. The graphics driver module 206 may determine the status of the task 212 and return the completion status to the API 208 which in turn returns the completion status to the application 202. The application 202 may continuously or at a specific interval request the completion status in a loop until the status indicates the task 212 is complete. The specific interval may be any interval defined by the application 202 and/or the graphics processing module 206. This and other embodiments will be discussed in more detail below with respect to FIG. 3.

Figure 3:
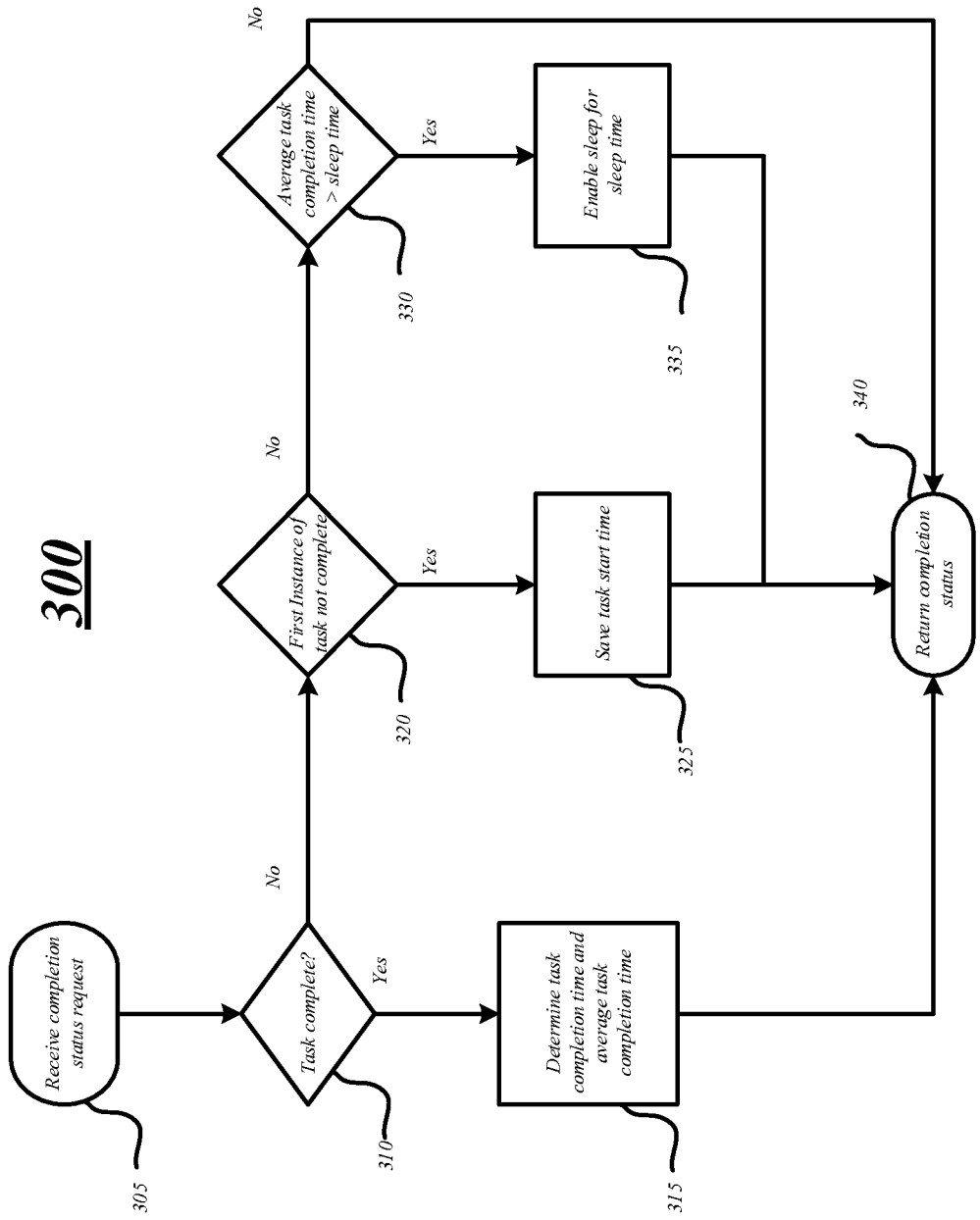
FIG. 3 illustrates an embodiment of a first logic flow.

FIG. 3 illustrates a first logic flow 300 for processing a task by a GPU. For clarity purposes, the logic flow is discussed with reference to system 100 and system 200 of FIGS. 1 and 2. At block 305, application programming interface (API) 204 may receive a request for completion status of the task 212 from the application 202. The task 212 may be any graphics-related task sent to the GPU 208 for processing from the application 202, as previously discussed. The API 204 may receive the request for completion status from the application 202 through a function call in the form of a query object. The API 204 may communicate the request to the graphics driver module 206 to determine the completion status of the task 212. API 204 may receive a result of complete or not complete from the graphics driver module 206 and returns the result to the application 202. In various embodiments, the graphics driver module 206 may return a not complete result to the API 204 until the task 212 is completely processed by the GPU 208. The API 204 may then return the result to the application 202. In this example, the processing circuit 102 processing the graphics driver module thread and request for completion status thread remains in a spin loop until the task 212 is processed and a result of complete is returned. This and alternative embodiments are discussed in more detail below.

At block 310, the graphics driver module 206 determines if the task 212 is complete. The graphics driver module 206 may communicate with the GPU 208 via the interconnect 220 to determine if the GPU 208 has processed the task 212. The graphics driver module 206 may communicate with the GPU 208 in any manner, such as through a function call or a low level instruction. In addition, graphics driver module 206 may communicate with GPU 208 directly or via an operating system (not shown). The graphics driver module 206 is not limited in this manner. Graphics driver module 206 may communicate with GPU 208 in any manner through any number of interconnects to receive the completion status of the task 212. The graphics driver module 206 may receive information indicating a result of complete or not complete for the task 212 from the GPU 208. The result of complete or not complete may then be sent to API 204 and the application 202 based on the information received from the GPU 208.

If the task 212 is complete, a task completion time and average task completion time are determined at block 315. In various embodiments, the graphics driver module 206 may calculate the task completion time and the average task completion. However, in other embodiments, the determination may be made by a processing circuit, a controller, a different module. For example, in various embodiments, task completion time and average task completion may be determined or calculated by the GPU 208. Various embodiments are not limited in this manner.

The task completion time may be calculated based on a determined task start time. As further discussed below with respect to block 325, a task start time may be saved the first time the graphics driver module 206 determines the task 212 is not complete. In addition to determining the task start time, a task finish time may be determined by the graphics driver module 206 and or the GPU 208. The task completion time may be calculated by determining the difference between the task start time and the task finish time. In various embodiments, the task completion time may then be saved in memory or storage, and used for future processing. The task completion time may also be used to determine the average task completion time.

The average task completion time may be a running average of task completion times for all the tasks processed by the GPU 208. For example, the graphics driver module 206 may determine and maintain the average task completion time for all of the tasks completed by the GPU 208. In some embodiments, completion times for different types of tasks may take different amounts of time. Therefore, an average task completion time may also be determined and maintained for each of similar tasks or task types. For example, the graphics driver modules 206 may determine and maintain the average task completion times for the different tasks or types of tasks the GPU 208 processes, such as a drawing task, a texturing task, a rasterization task, pixel processing task, a shading task, rendering 3-dimensional (3-D) images or graphics, rendering 2-dimensional (2-D) images and graphics, matrix computations, vector computations. Various embodiments are not limited in this manner. The graphics driver modules 206 and/or GPU 208 may determine and maintain any number of average tasks completion times.

If the task 212 is not complete at block 310, the graphics driver module 208 determines if this is the first instance the task 212 has been determined not complete at block 320. As previously discussed, the completion status may be requested one or more times and the graphics driver module 206 may determine or query the GPU 208 to determine if the task 212 is complete. If the graphics driver module 206 determines that this is the first instance the task 212 has been determined not complete, the graphics driver module 206 saves a task start time in memory or storage, at block 325.

If graphics driver module 206 determines this is the not the first instance that the task 212 has been determined not complete, the graphics driver module 206 determines if the average task completion time for the task 212 is greater than a sleep state time, at block 330. In various embodiments, the average task completion time may be the average task completion time for all the previous tasks completed. However, in other embodiments or the same embodiment, the average task completion time may be the average task completion time for a task or a particular task type, such as a drawing task, a texturing task, a rasterization task, pixel processing task, a shading task, rendering 3-dimensional (3-D) images or graphics, rendering 2-dimensional (2-D) images and graphics, matrix computations, vector computations, etc. The graphics driver module 206 may determine the task type being processed and use the average task completion time for that particular type of task for the comparison, for example.

In some instances, the sleep state time may be predetermined. The sleep state time may be based on a fraction of the average task completion time for a particular task. For example, if the average task completion time is 10 milliseconds (ms) the sleep state time may be set at 1 ms or 10 percent. The sleep state time may be set such that it benefits the system by saving processing circuit power without effecting system performance. In various embodiments the sleep state time may be set on the order of milliseconds. However, in various embodiments, the sleep state time is limited in this manner. The sleep state time may be set at any time such that it benefits the system by saving the processing circuit power without effecting system performance.

If at block 330 the graphics driver module 206 determines that the average task completion time is greater than the sleep state time, the graphics driver module 206 may instruct or enable the processing circuit 102 to sleep for the sleep state time at block 335. During the sleep state time, the processing circuit 102 may go into a sleep or low power state. While the processing circuit 102 is in the sleep state, the processing circuit may put to sleep various threads being processed by the processing circuit 102. For example, the processing circuit 102 may put to sleep the graphics driver module thread for monitoring or determining the completion status of the task 212.

In various embodiments, the system may put the processing circuit 102 into one of the sleep states defined by the advanced configuration and power interface (ACPI) specification. For example, the processing circuit may be put into one of the power states C1-C6. The ACPI defines C1 as a state where the processing circuit is not executing instructions, but can return to an executing state essentially instantaneously, C2 as a state where the processing circuit maintains all software-visible state, but may take longer to wake up and C3 as a state where the processing circuit does not need to keep its cache coherent, but maintains other state information. C4-C6 power states put the processing circuit into an even deeper power state. In some embodiments, C4-C6 progressively reduce a voltage power applied to the processing circuit. The voltage power may be lowered to 0 volts in the C6 power state. Various embodiments are not limited C-state sleep states. For example, the processing circuit 102 may be put into any sleep state such that it benefits the system by saving processing circuit power without effecting system performance.

If the graphics driver module 206 determines that the average task completion time is not greater than the sleep state time, the graphics driver module 206 may not put the processing circuit 102 into a sleep state and may return the completion status at block 340. The completion status may be returned to the application 202 via the API 204. In various embodiments, the graphics driver module 206 may return the completion status for a query object. For example, the graphics driver module 206 will determine the completion status of the query object created for a task and return the completion status to the application. The graphics driver module 206 will return a completion status of complete or not complete based on the determination made by the graphics driver module 206. In various embodiments, the application 202 and API 204 may continue to request a completion status until the returned completion status indicates the task 212 is complete. The processes as described in blocks 305 to 340 may be repeated until the task 212 is complete and the processing circuit may be put into a sleep state for the predetermined sleep state time multiple times.

Figure 4:
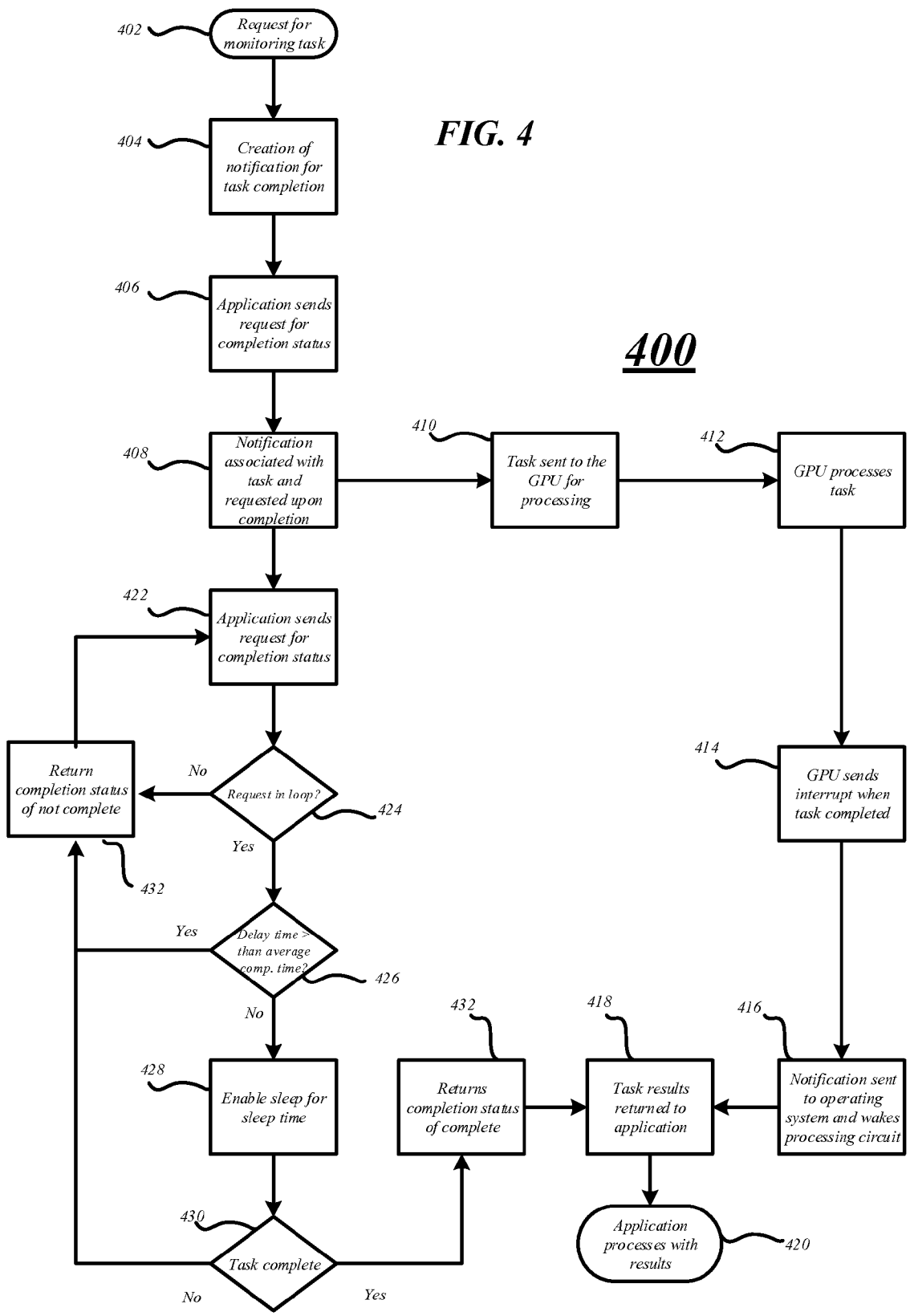
FIG. 4 illustrates an embodiment of a second logic flow.

FIG. 4 illustrates a second logic flow for processing the task 212 by a GPU 208 with a notification of a task completion. For clarity purposes, the logic flow is discussed with reference to systems 100 and 200 of FIGS. 1 and 2. At block 402, an application 202 sends task to a graphics driver module 206 for processing by the GPU 208 and a request to monitor the task 212. The application 202 may make the request in the form of a request for the creation of a query object. The query object may be any object generated to monitor a task to be processed by the GPU 208. The application 202 may send the request to the graphics driver module 206 via the API 204.

The graphics driver module 206 may create a notification for the completion status of the task 212 at block 404. The notification may be an event notification created in response to receiving the request for monitoring. In various embodiments, the event notification may be associated with the task 212 for processing by the GPU 208. The notification may be created by the graphics driver module 206 through an operating system for a computing system. As will be discussed in further detail below, the event notification may indicate when the task 212 is completed and may be sent to the graphics driver module 206 by a kernel mode driver of the operating system.

At block 406, an application initiates a request for completion status for the first time. For example, application 202 may send a request for completion status of the task 212 to the graphics driver module 206. This request may be similar to the request discussed in FIG. 3, block 305. In various embodiments, the request may be a query object submitted in a dynamic memory address (DMA) buffer to the graphics driver module 206. The DMA buffer containing the query object may be sent to the graphics driver module 206. The graphics driver module 206 may receive the request for completion status, and at block 408 the notification may be associated with the task 212. For example, the graphics driver module 206 may associate the event notification with the task 212 or query object and submit a request to the kernel mode driver for notification upon completion of the task 212. As previously discussed, the kernel mode driver may send the notification to the graphics driver module 206 indicating completion of the task 212.

At block 410, the task 212 may be sent to the GPU 208 for processing. In various embodiments, the task 212 may be sent to the GPU 208 in the DMA buffer as a set of query operations to be performed by the GPU 208. The GPU 208 may receive the task 212 and process the task 212 or set of query operations at block 412. If the GPU 208 has multiple tasks for completion, the task 212 may be put into the GPU work queue 210 as discussed above with respect to FIG. 2. The GPU work queue 210 may be a ring buffer and the GPU 208 may process the task 212 on a first come first serve basis or first in first out (FIFO). In other embodiments, the task 212 may have a priority level and the GPU 208 may process the task 212 based on the priority level. Tasks with high priorities will be processed before tasks with lower priorities. For example, the task 212 may be inserted into the GPU work queue 210 to be processed next if the task 212 has a high or highest priority.

At block 414, the task 212 is processed by the GPU 208 and the GPU 208 sends an interrupt to indicate completion of the task 212. In various embodiments, the interrupt may be sent to a kernel mode driver indicating completion of the task 212 in the DMA buffer. The task 212 may be processed by the GPU asynchronously while the processing circuit 102 is in a sleep state. In various embodiments, the GPU 208 may finish processing the task 212 before the processing circuit 102 comes out of the sleep state.

At block 416, a notification is sent to the operating system indicating the processing of the task 212 is complete. If the processing circuit is still in a sleep state, the operating system may wake the processing circuit 102. For example, the event notification associated with the task 212 may be sent to the operating system by the kernel mode driver and the operating system may wake the processing circuit 102 from the sleep state. The kernel mode driver sends the event notification upon receiving the interrupt indicating completion of the task 212. In this respect, the processing circuit 102 does not complete a sleep cycle but is awaken before the sleep state time expires. The processing circuit 102 may then process information sooner instead of waiting for the sleep state time to expire and the sleep cycle to complete.

In various instances, the operating system may wake one or more threads put to sleep while the task 212 is waiting to be processed or during processing by the GPU 208. While not limited in this respect, the one or more threads may include a graphics driver module thread monitoring the task 212. The one or more threads may also include any other threads that may be put to sleep while the task 212 is waiting to be processed or is being processed by the GPU 208.

At block 418, task results are returned to the application. In various embodiments, the graphics driver module 206 sends an indication that the task 212 is complete and returns the results of the task 212 to the application 202 via API 204. The task 212 results may be any information processed by the GPU 208 including, but not limited to the results of a graphics task, a drawing task, a texturing task, a rasterization task, pixel processing task, a shading task, rendering 3-dimensional (3-D) images or graphics, rendering 2-dimensional (2-D) images and graphics, matrix computations, vector computations, etc. Once the application 202 receives the results, the application may continue processing information with the results at block 420.

The application 202 may continue to request a completion status for the task 212 in a loop and the processing circuit 102 may be put into a sleep state for a sleep time as similarly discussed above with respect to FIG. 3. At block 422, the application may send a request for completion status of a task 212. In various embodiments, the API 204 may receive the request for completion status of the task 212 from the application 202. The task 212 may be any graphics-related task sent to the GPU 208 for processing from an application. The API 204 may receive the request for completion status from application 202 through a function call. The API 204 may communicate the request to the graphics driver module 206 to determine the completion status of the task 212.

At decision block 424, the graphics driver module 206 determines if the application 202 is requesting the completion status in a loop. For example, the application 202 may continuously or at a specific interval request the completion status for the task 212 until the completion status indicates that the task 212 is complete and/or the results are returned to the application. If at decision block 424, the graphics driver module 206 does not detect a loop, the graphics driver module 206 returns a completion status of not complete to the application 202 at block 432. As previously discussed, the graphics driver module 206 may return the completion status to the application 202 via the API 204.

If at decision block 424, the graphics driver module 206 does detect a loop, the graphics driver module 206 determines if a delay time is greater than (or equal to) the average task completion time for the task 212 at block 426. In various embodiments, the delay time may be 1 ms or time remaining till average completion time. As previously discussed, the average task completion time may be a running average of task completion times for all the tasks processed by the GPU 208. For example, the graphics driver module 206 may determine and maintain the average task completion time for all of the tasks completed by the GPU 208. In some embodiments, completion times for different tasks or types of tasks may take different amounts of time. Therefore, an average task completion time may also be determined and maintained for each of similar tasks or task types. For example, the graphics driver modules 206 may determine and maintain the average task completion times for the different types of tasks the GPU 208 processes, such as a drawing task, a texturing task, a rasterization task, pixel processing task, a shading task, rendering 3-dimensional (3-D) images or graphics, rendering 2-dimensional (2-D) images and graphics, matrix computations, vector computations, etc.

If at decision block 426 the graphics driver module 206 determines that the delay is greater than (or equal to) the average task completion time, the graphics driver module 206 returns the completion status of not complete to the application at block 432. In this example, the processing circuit 102 is not put into a sleep state because the GPU 208 is expected to finish processing the task 212 imminently. By enabling a sleep state for the processing circuit 102, the system 200 avoids the case where the task 212 may finish before the expiration of the sleep state time. However, if the processing circuit 102 is in a sleep state while the task 212 is completed, the processing circuit may be wakened as discussed above with respect to blocks 410-416.

If at decision block 426 the graphics driver module determines that the delay is not greater than the average task completion time, the graphics driver module 206 may instruct the processing circuit 102 to sleep for a sleep state time at block 428. As previously discussed, the sleep state time may be set such that it benefits the system by saving processing circuit power without effecting system performance and the sleep state time may be set on the order of milliseconds. During the sleep state time, the processing circuit 102 may go into a low power state. While the processing circuit 102 is in the sleep state, the processing circuit 102 may put to sleep various threads being processed by the processing circuit 102. For example, the processing circuit 102 may put to sleep the graphics driver module thread being processed for the task 212. In various embodiments, the system may put the processing circuit 102 into one of the sleep states defined by the advanced configuration and power interface (ACPI) specification, as previously discussed.

Upon completion of the sleep state for the sleep state time, the graphics driver module 206 determines if the task 212 is complete or not complete at block 430. The graphics driver module 206 may communicate with the GPU 208 via interconnect 220 to determine if the GPU 208 has processed the task 212. As previous discussed, graphics driver module 206 may communicate with GPU 208 in any manner through any number of interconnects to receive the completion status of the task 212. The graphics driver module 206 may receive information indicating a result of complete or not complete for the task 212. The result of complete or not complete may then be sent to API 204 and the application 202 based on the information received from the GPU 208.

If the graphics driver module 206 determines the task 212 is not complete at block 430, the graphics driver module 206 returns a completion status of not complete to the application 102 at block 432.

If the graphics driver module 206 determines the task 212 is complete at block 430, the graphics driver module 206 returns a completion status of complete to the application at block 434. The process then proceeds to block 418 and task 212 results are returned to the application 202. In various embodiments, the graphics driver module 206 sends an indication that the task 212 is complete and returns the results of the task 212 to the application 202 via API 204. The task results may be any information processed by the GPU 208 including, but not limited to the results of a graphics task, a drawing task, a texturing task, a rasterization task, pixel processing task, a shading task, rendering 3-dimensional (3-D) images or graphics, rendering 2-dimensional (2-D) images and graphics, matrix computations, vector computations, etc. Once the application 202 receives the results, the application may continue processing information with the results at block 420.

Figure 5:
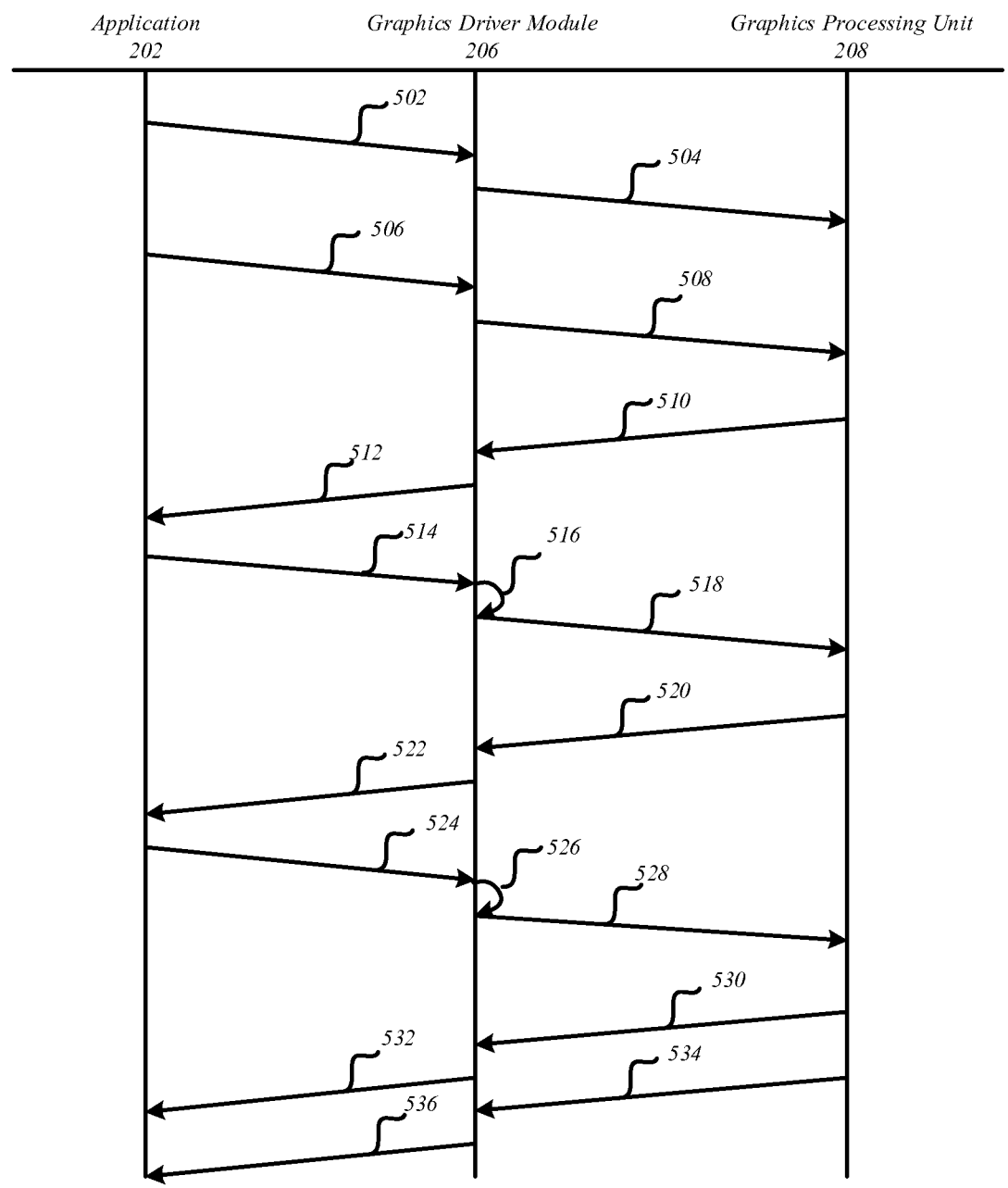
FIG. 5 illustrates an embodiment of a first signal diagram.

FIG. 5 illustrates an embodiment of a first signal diagram for processing a task 212 by a graphics processing unit (GPU). At line 502, application 202 sends a task 212 to the graphics driver module 206 for processing by the GPU 208. The task 212 may be sent to the graphics driver module 206 via the API 204, as previously discussed. The graphics driver module 206 may receive the task 212 and send the task 212 to the GPU 208 for processing at line 504. The GPU 208 may process the task 212 immediately or may put the task 212 in the GPU work queue 210 to be processed at a later time. For this this example, the task 212 is to be processed at a later time.

At line 506, the application 202 sends a first request for a completion status for the task 212 to the graphics driver module 208. The application 202 may send the first request via the API 204, as previously discussed. The graphics driver module 208 receives the request and may save a task start time for the task 212. In various embodiments, the graphics driver module 208 may not save the task start time for the task 212 when it receives the first request for completion status. In other embodiments, the graphics driver module 208 may save the task start time for the task 212 when the graphics driver module 208 receives the task 212 at line 502.

At line 508 the graphics processing module 208 sends a request to the GPU 208 to determine the completion status of the task 212. At line 510, the GPU 208 returns the completion status for the task 212. In this example, the GPU 208 returns a completion status of not complete to the graphics driver module 206 at line 510. The graphics processing module 206 receives the completion status from the GPU 208, and sends the completion status to the application 202 though the API 204 at line 512.

Lines 514-522 are similar to lines 506-512. The application 202 sends a second request for completion status of the task 212 to the graphics driver module 206 at line 514. However, once the graphics driver module 206 receives the second request for completion status, the graphics driver module 206 may put the processing circuit 102 into a sleep state for a sleep state time at line 516. The processing circuit 102 may sleep for the sleep state time as previously discussed above with respect to FIGS. 3 and 4. Various instances are not limited in this manner. The graphics driver module 206 may put the processing circuit 102 into a sleep state for a sleep state time when it receives the first request for completion status at line 506, for example.

At line 518 the graphics processing module 208 sends a request to the GPU 208 to determine the completion status of the task 212. At line 520, the GPU 208 returns the completion status for the task 212 of not complete, in this example. The graphics processing module 206 receives the completion status from the GPU 208, and sends the completion status to the application 202 though the API 204 at line 522. In this example, the processing of the task 212 is not complete during the completion status loop for the second request. However, various embodiments are not limited in this manner. For example, the processing of the task 212 may be completed and a completion status of complete may be returned to the application 202 at any time.

For example, lines 524-532 are similar to lines 512-522. However, the GPU 208 has finished processing the task 212 and a completion status of complete is returned to the application 202 at line 532. In addition to returning a completion status of complete, the GPU sends the results of the task 212 to the graphics driver module 206 at line 534. The results may be sent at the same time the completion status is sent to the graphics driver module 206. For example, the GPU 208 may send the results in the same message as the completion status to the graphics driver module 206 so that there is no delay in the graphics module 206 and application 202 in receiving the results of the task 212. However, in various embodiments, the results may be sent to the graphics module 206 in a different message at a different time than the completion status.

The graphics driver module 206 receives the results of the task 212 and sends the results to the application 202 at line 536. The results may be sent to the application 202 through the API 204. The application may then proceed with processing with the results of the task 212 completed by the GPU 208.

In the above recited example, the application 202 sends three requests for completion status of the task 212 before a result of complete is returned along with the results of the task 212. In addition, the graphics driver module 206 put the processing circuit 102 into a sleep state for a sleep state time twice. However, various embodiments are not limited in this manner. In some instances, the task 212 may be completed by the GPU 208 sooner or later than the above-recited example. Moreover, any number of requests may be sent and sleep states may be entered. In various embodiments, the graphics driver module 206 may not put the processing circuit 102 into a sleep state. For example, the graphics driver module 206 may determine that the average task 212 completion time is not greater than the sleep state time, as discussed above with respect to block 330 and the graphics driver module 206 may not put the processing circuit 102 into a sleep state. Other embodiments are discussed and described herein.

FIG. 6 illustrates an embodiment of a third logic flow 600. The logic flow 600 may be representative of some or all of the operations executed by one or more embodiments described herein. For example, the logic flow 600 may illustrate operations performed by the systems 100 and 200.

In the illustrated embodiment shown in FIG. 6, the logic flow 600 may include monitoring a task of a graphics processing unit (GPU) by a graphics driver at block 605. The task may be any task for processing by the GPU, including but not limited to a graphics task, a drawing task, a texturing task, a rasterization task, pixel processing task, a shading task, rendering 3-dimensional (3-D) images or graphics, rendering 2-dimensional (2-D) images and graphics, matrix computations, vector computations, etc. At block 610 one or more elements, circuits, software modules, etc., may determine if the task is complete.

At block 615 an average task completion time for the task is determined if the task is not complete. The average task completion time may be a running average of task completion times for all the tasks processed by the GPU. For example, one or more elements, circuits, modules, etc. may determine and maintain the average task completion time for all of the tasks completed by the GPU. In some embodiments, completion times for different tasks or types of tasks may take different amounts of time. Therefore, an average task completion time may also be determined and maintained for each of similar tasks or task types, as previously discussed.

At block 620 a sleep state for a processing circuit for a sleep state time is enabled if the average task completion time is greater than the sleep state time. The sleep state time may be predetermined and may be based on a fraction of the average task completion time for a particular task. For example, if the average task completion time is 10 milliseconds (ms) the sleep state time may be set at 1 ms or 10 percent. The sleep state time may be set such that it benefits the system by saving processing circuit power without effecting system performance.

Figure 7:
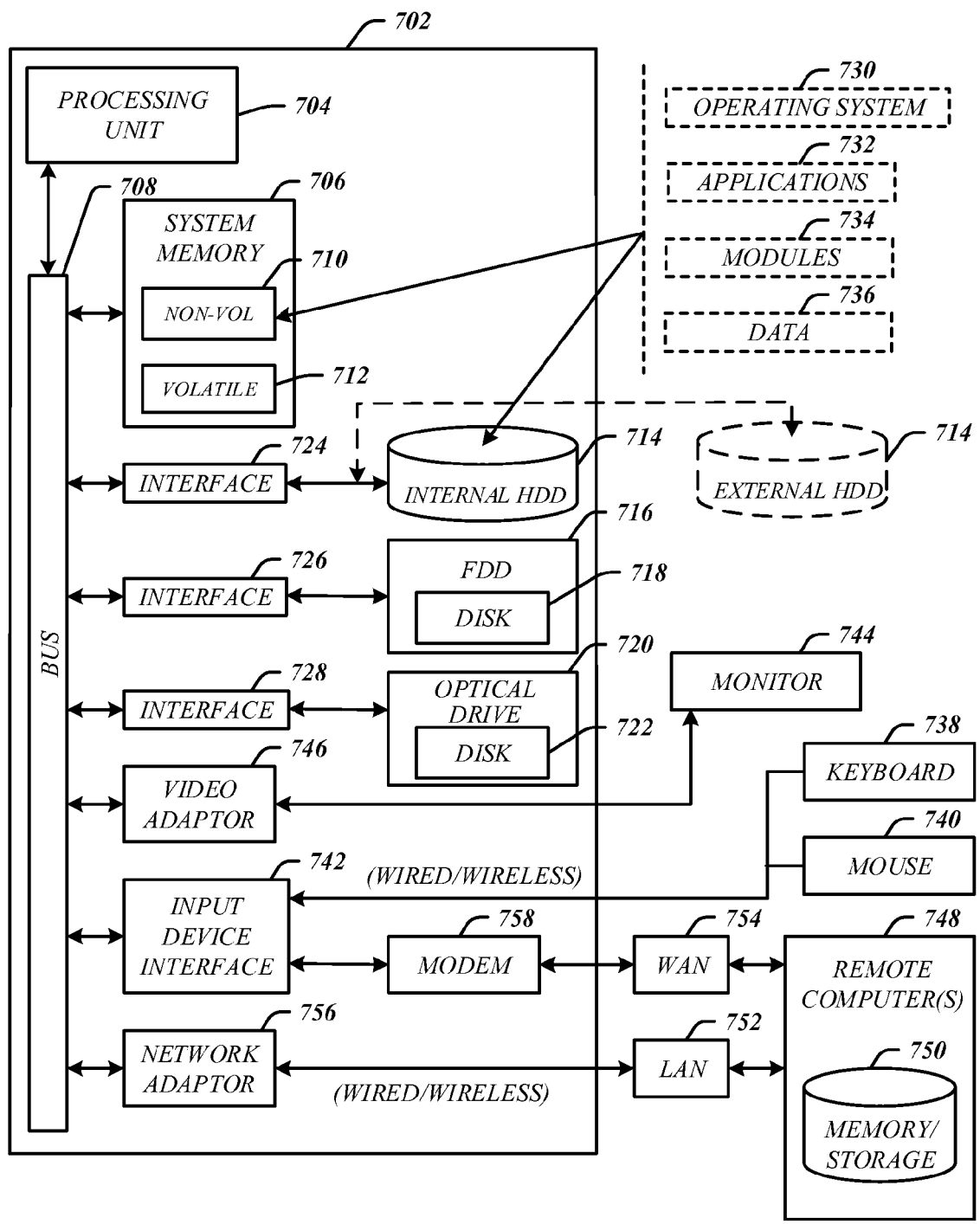
FIG. 7 illustrates an embodiment of a first computing architecture.

FIG. 7 illustrates an embodiment of an exemplary computing architecture 700 suitable for implementing various embodiments as previously described. In one embodiment, the computing architecture 700 may comprise or be implemented as part of wristband 110 and/or computing device 115.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor 130 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the touch gesture recognition system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through forty-six (1-46) provided below are intended to be exemplary and non-limiting.

In a first example, an apparatus may include a memory, a processing circuit coupled to the memory, and a graphics processing unit (GPU) coupled to the processing circuit and the memory to process graphics-related tasks. The apparatus may also include a graphics driver module to monitor a task of the GPU, determine when the task is complete, determine an average task completion time for the task when the task is not complete, and enable a sleep state for a processing circuit for a sleep state time when the average task completion time is greater than the sleep state time.

In a second example, an apparatus may include a graphics driver module to disable the sleep state for the processing circuit upon expiration of the sleep state time or upon completion of the task.

In a third example, an apparatus may include a graphics driver module to store a task start time when the task is not complete.

In a fourth example, an apparatus may include a graphics driver module to determine a task completion time for the task based on the task start time when the task is complete.

In a fifth example, an apparatus may include a graphics driver module to determine an average task completion based upon an average of one or more task completion times for one or more tasks.

In a sixth example, an apparatus may include a graphics driver module to receive a request from an application for a completion status of the task and send a response to the application indicating whether the task is complete or not complete based upon the completion status.

In a seventh example, an apparatus may include a graphics driver module to generate an event notification for the task, receive the event notification indicating completion of the task, and disable the sleep state for the processing circuit upon receiving the event notification.

In an eighth example, an apparatus may include a graphics driver module to generate an event notification for the task, receive the event notification indicating completion of the task, and disable the sleep state for the processing circuit upon receiving the event notification, wherein the event notification is generated by the graphics driver and is based upon a received interrupt.

In a ninth example, an apparatus may include an application and a graphics driver module to return a task result to the processing circuit for the application upon completion of the task.

In a tenth example, an apparatus may include a graphics driver module to receive a request for creation of a query object for the task, and create the query object for monitoring the task on the GPU.

In an eleventh example, an apparatus may include a graphics driver module to determine when the query object for the task is complete indicating completion of the task on the GPU.

In a twelfth example, wherein a task is at least one of a computer graphics task, a 3-dimensional (3D) graphics task, and a 2-dimensional (2D) graphics task.

In a thirteenth example, a computer-implemented method may include monitoring a task of a graphics processing unit (GPU) by a graphics driver, determining when the task is complete, determining an average task completion time for the task when the task is not complete, and enabling a sleep state for a processing circuit for a sleep state time when the average task completion time is greater than the sleep state time.

In a fourteenth example, a computer-implemented method may include disabling the sleep state for the processing circuit upon expiration of the sleep state time or upon completion of the task.

In a fifteenth example, a computer-implemented method may include storing a task start time when the task is not complete.

In a sixteenth example, a computer-implemented method may include determining a task completion time for the task based on the task start time when the task is complete.

In a seventeenth example, a computer-implemented method may include determining an average task completion based upon an average of one or more task completion times for one or more tasks.

In a eighteenth example, a computer-implemented method may include receiving a request from an application for a completion status of the task and sending a response to the application indicating whether the task is complete or not complete based upon the completion status.

In a nineteenth example, a computer-implemented method may include generating an event notification for the task, receiving the event notification indicating completion of the task and disabling the sleep state for the processing circuit upon receiving the event notification.

In a twentieth example, a computer-implemented method may include generating an event notification for the task, receiving the event notification indicating completion of the task and disabling the sleep state for the processing circuit upon receiving the event notification, wherein the event notification is generated by the graphics driver and is based upon a received interrupt.

In a twenty-first example, a computer-implemented method may include returning a task result to the processing circuit upon completion of the task.

In a twenty-second example, a computer-implemented method may include receiving a request for creation of a query object for the task and creating the query object for monitoring the task on the GPU.

In a twenty-third example, a computer-implemented method may include determining when a query object for the task is complete indicating completion of the task on the GPU.

In a twenty-fourth example, a computer-implemented method may include a task that is at least one of a computer graphics task, a 3-dimensional (3D) graphics task, and a 2-dimensional (2D) graphics task.

In a twenty-fifth example, an article may include a computer-readable storage medium containing a plurality of instructions that when executed enable a processing circuit to monitor a task of a graphics processing unit (GPU) by a graphics driver, determine when the task is complete, determine an average task completion time for the task when the task is not complete and enable a sleep state for a processing circuit for a sleep state time when the average task completion time is greater than the sleep state time.

In a twenty-sixth example, an article may include a computer-readable storage medium containing a plurality of instructions that when executed enable a processing circuit to disable the sleep state for the processing circuit upon expiration of the sleep state time or upon completion of the task.

In a twenty-seventh example, an article may include a computer-readable storage medium containing a plurality of instructions that when executed enable a processing circuit to receive a request from an application for a completion status of the task and send a response to the application indicating whether the task is complete or not complete based upon the completion status.

In a twenty-eighth example, an article may include a computer-readable storage medium containing a plurality of instructions that when executed enable a processing circuit to generate an event notification for the task, receive the event notification indicating completion of the task and disable the sleep state for the processing circuit upon receiving the event notification.

In a twenty-ninth example, an article may include a computer-readable storage medium containing a plurality of instructions that when executed enable a processing circuit to generate an event notification for the task, receive the event notification indicating completion of the task and disable the sleep state for the processing circuit upon receiving the event notification, wherein the event notification is generated by the graphics driver and is based upon a received interrupt.

In a thirtieth example, an article may include a computer-readable storage medium containing a plurality of instructions that when executed enable a processing circuit to return a task result to the processing circuit upon completion of the task.

In a thirty-first example, an article may include a computer-readable storage medium containing a plurality of instructions that when executed enable a processing circuit to store a task start time when the task is not complete.

In a thirty-second example, an article may include a computer-readable storage medium containing a plurality of instructions that when executed enable a processing circuit to determine a task completion time for the task based on the task start time when the task is complete.

In a thirty-third example, an article may include a computer-readable storage medium containing a plurality of instructions that when executed enable a processing circuit to determine an average task completion based upon an average of one or more task completion times for one or more tasks.

In a thirty-fourth example, an article may include a computer-readable storage medium containing a plurality of instructions that when executed enable a processing circuit to receive a request for creation of a query object for the task and creating the query object for monitoring the task on the GPU.

In a thirty-fifth example, an article may include a computer-readable storage medium containing a plurality of instructions that when executed enable a processing circuit to determine when a query object for the task is complete indicating completion of the task on the GPU.

In a thirty-sixth example, wherein the task is at least one of a computer graphics task, a 3-dimensional (3D) graphics task, and a 2-dimensional (2D) graphics task.

In an thirty-seventh example, an apparatus may include means for monitoring a task of a graphics processing unit (GPU), means for determining when the task is complete, means for determining an average task completion time for the task when the task is not complete and means for enabling a sleep state for a processing circuit for a sleep state time when the average task completion time is greater than the sleep state time.

In a thirty-eighth example, an apparatus may include means for disabling the sleep state for the processing circuit upon expiration of the sleep state time or upon completion of the task.

In a thirty-ninth example, an apparatus may include means for storing a task start time when the task is not complete.

In a fortieth example, an apparatus may include means for determining a task completion time for the task based on the task start time when the task is complete.

In a forty-first example, an apparatus may include means for determining an average task completion based upon an average of one or more task completion times for one or more tasks.

In a forty-second example, an apparatus may include means for receiving a request from an application for a completion status of the task and means for sending a response to the application indicating whether the task is complete or not complete based upon the completion status.

In a forty-third example, an apparatus may include means for generating an event notification for the task, means for receiving the event notification indicating completion of the task and means for disabling the sleep state for the processing circuit upon receiving the event notification.

In a forty-fourth example, an apparatus may include means for generating an event notification for the task, means for receiving the event notification indicating completion of the task and means for disabling the sleep state for the processing circuit upon receiving the event notification, wherein the event notification is generated by the graphics driver and is based upon a received interrupt.

In a forty-fifth example, an apparatus may include means for returning a task result to the processing circuit upon completion of the task.

In a forty-sixth example, an apparatus may include means for determining when the query object for the task is complete indicating completion of the task on the GPU.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a memory;
   a processing circuit coupled to the memory;
   a graphics processing unit (GPU) coupled to the processing circuit and the memory to process graphics-related tasks; and
   a graphics driver module to monitor a task of the GPU, determine when the task is complete, determine an average task completion time for the task when the task is not complete, and instruct the processing circuit to sleep for a sleep state time when the average task completion time is greater than the sleep state time to put to sleep at least one thread on which a portion of the graphics driver module is executed by the processing circuit to monitor the task and to determine when the task is complete during the sleep state.

2. The apparatus of claim 1, the graphics driver module to disable the sleep state for the processing circuit upon expiration of the sleep state time or upon completion of the task.

3. The apparatus of claim 1, the graphics driver module to store a task start time when the task is not complete.

4. The apparatus of claim 3, the graphics driver module to determine a task completion time for the task based on the task start time when the task is complete.

5. The apparatus of claim 1, the graphics driver module to determine an average task completion based upon an average of one or more task completion times for one or more tasks.

6. The apparatus of claim 1, the graphics driver module to receive a request from an application for a completion status of the task and send a response to the application indicating whether the task is complete or not complete based upon the completion status.

7. The apparatus of claim 1, the graphics driver module to generate an event notification for the task, receive the event notification indicating completion of the task, and disable the sleep state for the processing circuit upon receiving the event notification.

8. The apparatus of claim 7, wherein the event notification is generated by the graphics driver and is based upon a received interrupt.

9. The apparatus of claim 1, comprising:
   an application; and
   the graphics driver module to return a task result to the processing circuit for the application upon completion of the task.

10. The apparatus of claim 1, the graphics driver module to receive a request for creation of a query object for the task, and create the query object for monitoring the task on the GPU.

11. The apparatus of claim 10, the graphics driver module to determine when the query object for the task is complete indicating completion of the task on the GPU.

12. The apparatus of claim 1, wherein the task is at least one of a computer graphics task, a 3-dimensional (3D) graphics task, and a 2-dimensional (2D) graphics task.

13. A computer-implemented method, comprising:
   monitoring, by execution of a portion of a graphics driver module on a thread of a processing circuit, a task of a graphics processing unit (GPU) by a graphics driver;
   determining, by execution of the portion of the graphics driver module on the thread, when the task is complete;
   determining an average task completion time for the task when the task is not complete; and
   instructing the processing circuit to sleep for a sleep state time when the average task completion time is greater than the sleep state time to put the execution of the portion of the graphics driver module on the thread to sleep during the sleep state.

14. The computer-implemented method of claim 13, comprising:
   disabling the sleep state for the processing circuit upon expiration of the sleep state time or upon completion of the task.

15. The computer-implemented method of claim 13, comprising:
   storing a task start time when the task is not complete.

16. The computer-implemented method of claim 15, comprising:
   determining a task completion time for the task based on the task start time when the task is complete.

17. The computer-implemented method of claim 13, comprising:
   determining an average task completion based upon an average of one or more task completion times for one or more tasks.

18. The computer-implemented method of claim 13, comprising:
   receiving a request from an application for a completion status of the task; and
   sending a response to the application indicating whether the task is complete or not complete based upon the completion status.

19. The computer-implemented method of claim 13, comprising:
   generating an event notification for the task, the event notification is generated by the graphics driver and is based upon a received interrupt;
   receiving the event notification indicating completion of the task; and
   disabling the sleep state for the processing circuit upon receiving the event notification.

20. The computer-implemented method of claim 13, comprising:
   returning a task result to the processing circuit upon completion of the task.

21. The computer-implemented method of claim 13, comprising:
   receiving a request for creation of a query object for the task;
   creating the query object for monitoring the task on the GPU; and
   determining when the query object for the task is complete indicating completion of the task on the GPU.

22. A non-transitory computer-readable storage medium containing a plurality of instructions that when executed enable a processing circuit to:

monitor, by execution of a portion of a graphics driver module on a thread of the processing circuit, a task of a graphics processing unit (GPU) by a graphics driver;

determine, by execution of the portion of the graphic driver module on the thread, when the task is complete;

determine an average task completion time for the task when the task is not complete;

instruct the processing circuit to sleep for a sleep state time when the average task completion time is greater than the sleep state time to put the execution of the portion of the graphics driver module on the thread to sleep during the sleep state.

23. The non-transitory computer-readable storage medium of claim 22, comprising instructions that when executed enable the processing circuit to disable the sleep state for the processing circuit upon expiration of the sleep state time or upon completion of the task.

24. The non-transitory computer-readable storage medium of claim 22, comprising instructions that when executed enable the processing circuit to:

receive a request from an application for a completion status of the task; and send a response to the application indicating whether the task is complete or not complete based upon the completion status.

25. The non-transitory computer-readable storage medium of claim 22, comprising instructions that when executed enable the processing circuit to:

generate an event notification for the task, the event notification is generated by the graphics driver and is based upon a received interrupt;

receive the event notification indicating completion of the task; and disable the sleep state for the processing circuit upon receiving the event notification.

* * * * *